United States Patent
Oono (10) Patent No.: US 11,252,539 B2
(45) Date of Patent: Feb. 15, 2022

(54) MESSAGE DELIVERY DEVICE, METHOD, AND RECORDING MEDIUM

(71) Applicant: NEC CORPORATION, Tokyo (JP)

(72) Inventor: Tadayuki Oono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/962,884

(22) PCT Filed: Jan. 15, 2019

(86) PCT No.: PCT/JP2019/000817
§ 371 (c)(1),
(2) Date: Jul. 17, 2020

(87) PCT Pub. No.: WO2019/142751
PCT Pub. Date: Jul. 25, 2019

(65) Prior Publication Data
US 2021/0051450 A1 Feb. 18, 2021

(30) Foreign Application Priority Data

Jan. 18, 2018 (JP) .............................. JP2018-006435

(51) Int. Cl.
*H04W 4/12* (2009.01)
*H04W 24/02* (2009.01)

(52) U.S. Cl.
CPC ............. *H04W 4/12* (2013.01); *H04W 24/02* (2013.01)

(58) Field of Classification Search
CPC combination set(s) only.
See application file for complete search history.

(56) References Cited

U.S. PATENT DOCUMENTS

| 8,254,971 | B1* | 8/2012 | Mikan | H04L 1/1887 455/466 |
| 2008/0270548 | A1* | 10/2008 | Glickstein | G06Q 10/107 709/206 |
| 2008/0287150 | A1* | 11/2008 | Jiang | G06Q 30/0277 455/466 |
| 2009/0197622 | A1* | 8/2009 | Atarius | H04L 51/30 455/466 |

(Continued)

FOREIGN PATENT DOCUMENTS

| JP | 10-262143 A | 9/1998 |
| JP | 2000-174731 A | 6/2000 |

(Continued)

OTHER PUBLICATIONS

International Search Report of PCT/JP2019/000817 dated Mar. 12, 2019 [PCT/ISA/210].

(Continued)

*Primary Examiner* — Steven S Kelley
(74) *Attorney, Agent, or Firm* — Sughrue Mion, PLLC (57) ABSTRACT

In order to make it possible to suppress increase in the cost of message retransmission, this message delivery device delivers a message, stores a history relating to the success or failure of the delivery to each of destinations of the message in a history storage unit, when the delivery of the message has failed, determines on the basis of the history whether to perform retransmission of the message, and when determining to perform the retransmission, performs the retransmission of the message.

9 Claims, 10 Drawing Sheets

(56) References Cited

U.S. PATENT DOCUMENTS

| | | | | |
|---|---|---|---|---|
| 2010/0304765 A1* | 12/2010 | Bhatt | .................... | H04L 67/00 |
| | | | | 455/466 |
| 2010/0317321 A1* | 12/2010 | Cai | ...................... | H04W 4/12 |
| | | | | 455/410 |
| 2012/0088528 A1* | 4/2012 | Zhong | .................... | H04W 4/14 |
| | | | | 455/466 |
| 2012/0331101 A1* | 12/2012 | Itaya | .................... | H04L 51/34 |
| | | | | 709/217 |
| 2014/0098758 A1* | 4/2014 | Cheng | .................... | H04W 4/24 |
| | | | | 370/329 |
| 2017/0041213 A1* | 2/2017 | Nadalin | ................ | H04L 45/22 |

FOREIGN PATENT DOCUMENTS

| | | | |
|---|---|---|---|
| JP | 2002-111707 A | 4/2002 | |
| JP | 2003-309710 A | 10/2003 | |
| JP | 2011-049852 A | 3/2011 | |
| JP | 2012-516659 A | 7/2012 | |
| JP | 2013-115674 A | 6/2013 | |
| JP | 2017-092687 A | 5/2017 | |

OTHER PUBLICATIONS

Written Opinion of PCT/JP2019/000817 dated Mar. 12, 2019 [PCT/ISA/237].

Japanese Office Communication for JP Application No. 2019-566450 dated Nov. 24, 2021 with English Translation.

\* cited by examiner

| DESTINATION | ONE TIME BEFORE | TWO TIMES BEFORE | THREE TIMES BEFORE | FOUR TIMES BEFORE | FIVE TIMES BEFORE |
|---|---|---|---|---|---|
| USER A | 1 | 1 | 2 | 4 | 1 |
| USER B | 0 | 0 | 0 | 0 | 0 |
| USER C | 1 | 1 | 1 | 1 | 1 |

Fig.5

| MESSAGE | DESTINATION | DELIVERY DESTINATION CARRIER | IMMEDIACY |
|---|---|---|---|
| MESSAGE a | USER A | COMMUNICATION CARRIER X | NONE |
| MESSAGE b | USER B | COMMUNICATION CARRIER Y | IMMEDIATE |
| MESSAGE c | USER C | COMMUNICATION CARRIER Z | NONE |

Fig.6

| COMMUNICATION CARRIER | DELIVERY COST |
|---|---|
| COMMUNICATION CARRIER X | 10 |
| COMMUNICATION CARRIER Y | 0 |
| COMMUNICATION CARRIER Z | 5 |

MESSAGE DELIVERY DEVICE, METHOD, AND RECORDING MEDIUM

CROSS REFERENCE TO RELATED APPLICATIONS

This application is a National Stage of International Application No. PCT/JP2019/000817, filed Jan. 15, 2019, claiming priority to Japanese Patent Application No. 2018-006435, filed Jan. 18, 2018, the contents of all of which are incorporated herein by reference in their entirety.

TECHNICAL FIELD

The present invention relates to a message delivery device, a method, and a recording medium that deliver a message.

BACKGROUND ART

When a message delivery device delivers a message to a user terminal, delivery of the message may fail due to an in-zone state and the like of the user terminal.

In order to improve a success rate of message delivery, many message delivery devices retransmit, when failing to deliver a message, the message having failed to be delivered.

A method described in PTL 1 refers to transmission history information and preferentially transmits data to a transmission destination having a high success rate. Thereby, a total transmission success rate can be improved.

CITATION LIST

Patent Literature

[PTL 1] Japanese Unexamined Patent Application Publication No. 2003-309710

SUMMARY OF INVENTION

Technical Problem

However, when a message is delivered, a communication band and a cost such as an amount of money are required. Therefore, when a message having failed to be delivered is retransmitted until success, reachability of the message can be improved, but a cost required for delivery is increased. When data are transmitted also to a transmission destination having a low success rate as in PTL1, an effect of improving reachability may become small, compared with an input cost.

An object of the present invention is to provide a message delivery device, a method, and a recording medium being capable of reducing an increase in a cost required for message retransmission.

Solution to Problem

In order to solve the above-described problem, a message delivery device according to the present invention includes: a message delivery means that delivers a message; a history management means that stores, in a history storage means, a history relating to success or failure of the delivery to each of destinations of the message; and a retransmission determination means that issues, when a result of determining, based on the history, whether to perform retransmission of the message is positive when the delivery of the message fails, an instruction for the retransmission of the message to the message delivery means.

A message delivery method according to the present invention includes: delivering a message; storing, in a history storage unit, a history relating to success or failure of the delivery to each of destinations of the message; determining, based on the history, whether to perform retransmission of the message when the delivery of the message fails; and performing the retransmission of the message when determining to perform the retransmission.

A non-transitory computer-readable recording medium according to the present invention records a message delivery program causing a computer to execute: a message delivery function of delivering a message; a history management function of storing, in a history storage unit, a history relating to success or failure of the delivery to each of destinations of the message; and a retransmission determination function of issuing, when a result of determining, based on the history, whether to perform retransmission of the message is positive when the delivery of the message fails, an instruction for the retransmission of the message to the message delivery function.

Advantageous Effects of Invention

According to the message delivery device, the method, and the recording medium of the present invention, an increase in a cost required for message retransmission can be reduced.

EXAMPLE EMBODIMENT

First Example Embodiment

A first example embodiment of the present invention is described.

Figure 1:
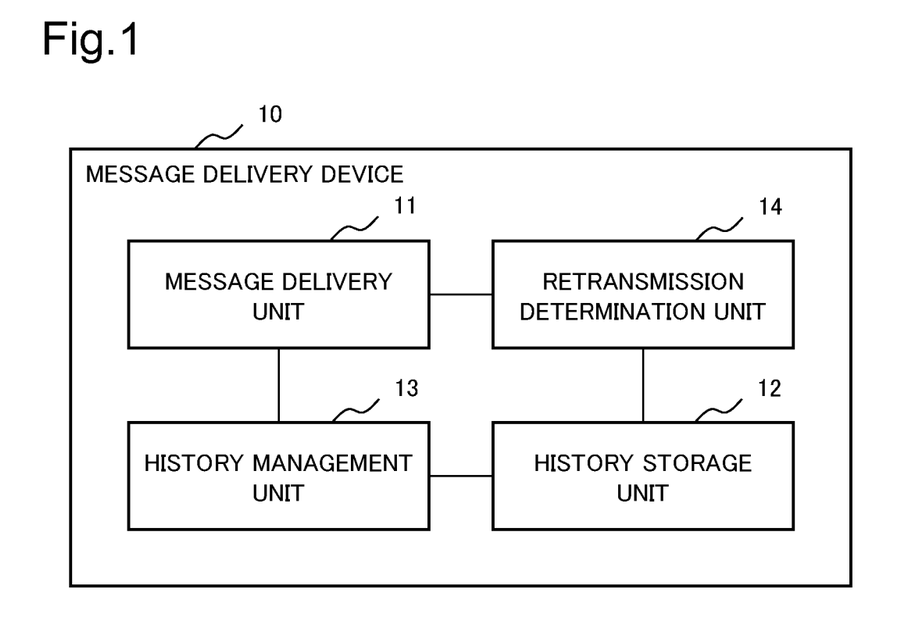
FIG. 1 shows a diagram illustrating a configuration example of a message delivery device according to a first example embodiment of the present invention.

FIG. 1 illustrates a configuration example of a message delivery device 10 according to the present example embodiment. The message delivery device 10 according to the present example embodiment includes a message delivery unit 11, a history storage unit 12, a history management unit 13, and a retransmission determination unit 14.

The message delivery unit 11 is a portion that delivers a message. The history management unit 13 is a portion that stores, in the history storage unit 12, a history relating success or failure of delivery to each of destinations of a message. The retransmission determination unit 14 is a portion that issues, when a result of determining, based on a history, whether to perform retransmission of a message is positive when delivery of the message fails, an instruction for the retransmission of the message to the message delivery unit 11.

When the message delivery device 10 is configured as described above, the message delivery device 10 determines, based on a history relating to success or failure of delivery to each of destinations of a message, whether to perform retransmission of the message and performs the retransmission of the message when determining to perform the retransmission. Thereby, the message delivery device 10 reduces messages to be retransmitted. Therefore, an increase in a cost required for message retransmission can be reduced.

Figure 2:
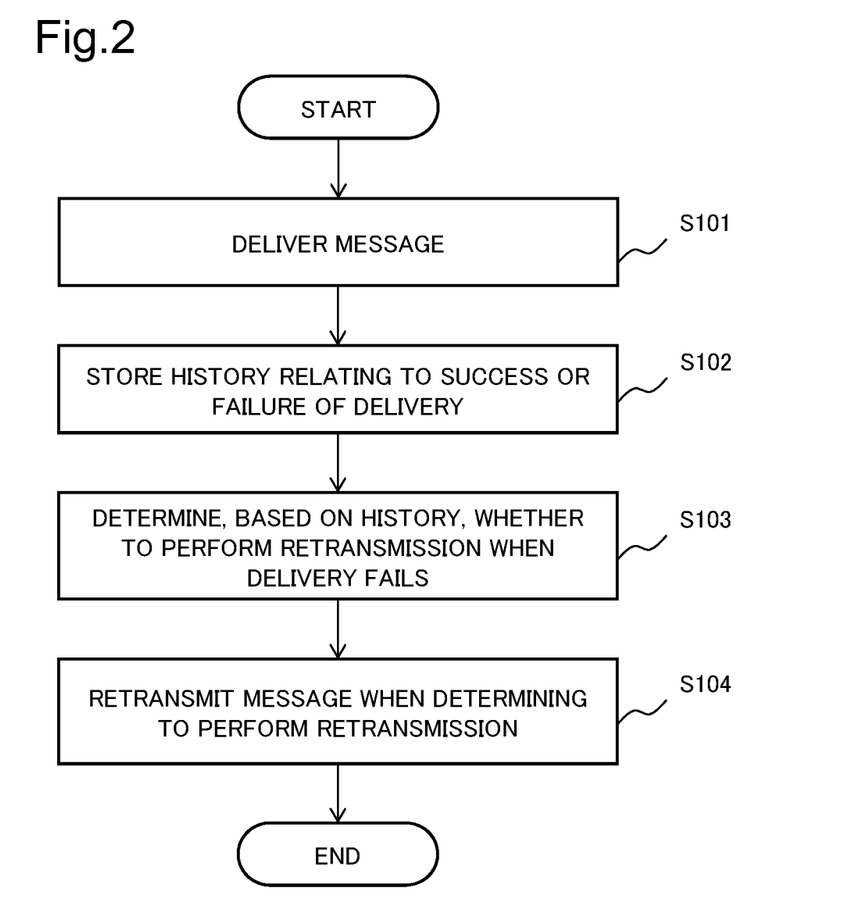
FIG. 2 shows a diagram illustrating an operation example of the message delivery device according to the first example embodiment of the present invention.

Next, FIG. 2 illustrates an example of an operation of the message delivery device 10 according to the present example embodiment.

The message delivery unit 11 delivers a message (step S101). The history management unit 13 stores, in the history storage unit 12, a history relating to success or failure of the delivery to each of destinations of the message (step S102). The retransmission determination unit 14 determines, based on the history, whether to perform retransmission of the message when the delivery of the message fails (step S103). The message delivery unit 11 performs the retransmission of the message when determining to perform the retransmission (step S104).

When operating as described above, the message delivery device 10 determines, based on a history relating to success or failure of delivery to each of destinations of a message, whether to perform retransmission of the message and performs the retransmission of the message when determining to perform the transmission. Thereby, the message delivery device 10 reduces messages to be retransmitted. Therefore, an increase in a cost required for message retransmission can be reduced.

As described above, according to the first example embodiment of the present invention, the message delivery device 10 determines, based on a history relating to success or failure of delivery to each of destinations of a message, whether to perform retransmission of the message and performs the retransmission of the message when determining to perform the transmission. Thereby, the message delivery device 10 reduces messages to be retransmitted. Therefore, an increase in a cost required for message retransmission can be reduced.

Second Example Embodiment

Next, a second example embodiment of the present invention is described. According to the present example embodiment, a message delivery device 10 that delivers a short message service (SMS) is more specifically described.

Figure 3:
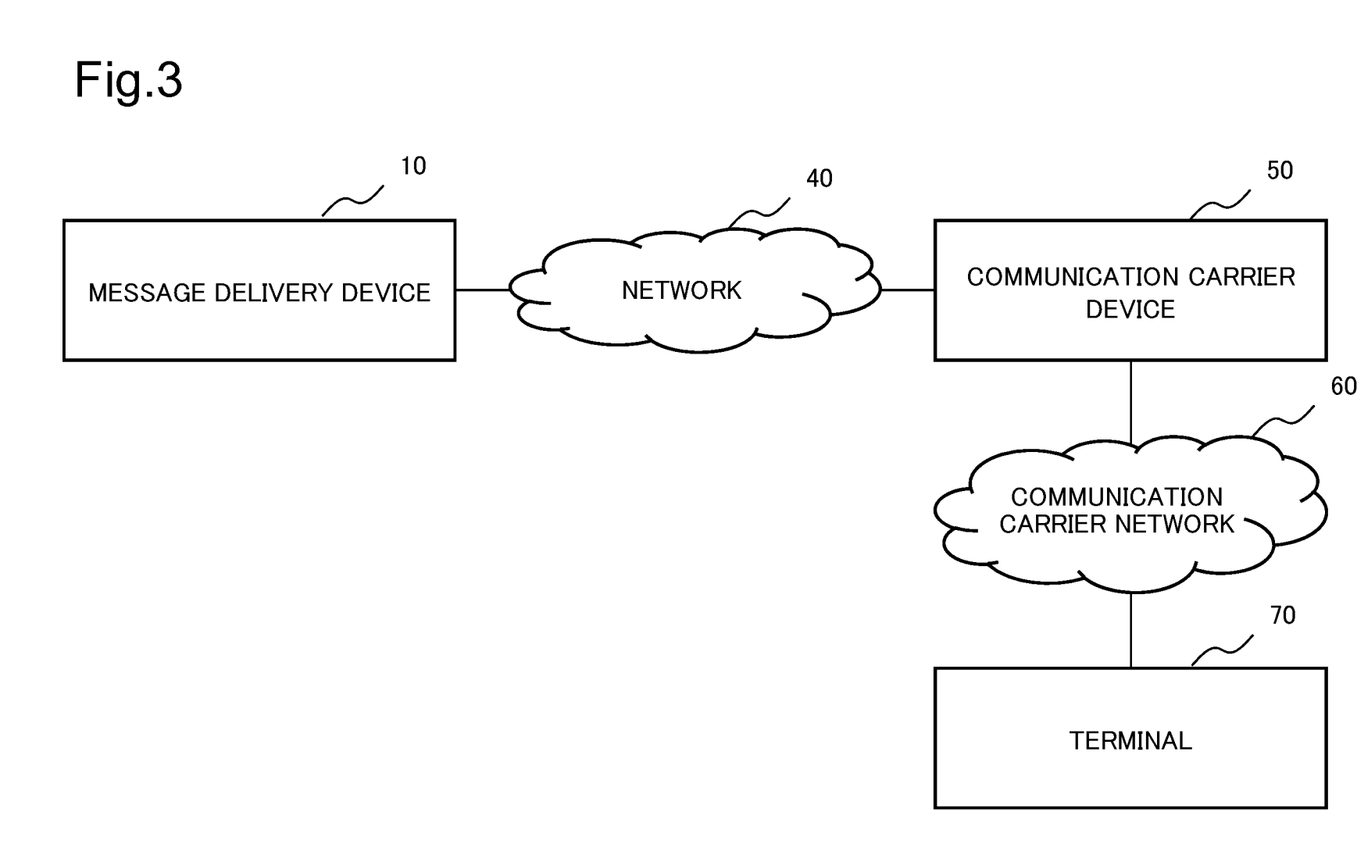
FIG. 3 shows a diagram illustrating a configuration example of a message delivery system according to a second example embodiment of the present invention.

First, FIG. 3 illustrates a configuration example of a message delivery system according to the present example embodiment. The message delivery system according to the present example embodiment includes a message delivery device 10, a communication carrier device 50, and a terminal 70. The message delivery device 10 is an SMS delivery base device that performs SMS delivery. The message delivery device 10 first issues, in order to deliver an SMS to the terminal 70, a delivery request of the SMS to the communication carrier device 50 via a network 40. The communication carrier device 50 delivers an SMS to the terminal 70 via a communication carrier network 60. The communication carrier device 50 reports, to the message delivery device 10, a delivery result (success or failure) of an SMS to the terminal 70.

Next, by using FIG. 1, a configuration example of the message delivery device 10 according to the present example embodiment is described.

The message delivery unit 11 is a portion that delivers a message. In a case according to the present example embodiment, the message delivery unit 11 issues a delivery request of an SMS to the communication carrier device 50 and receives a delivery result from the communication carrier device 50. The message delivery unit 11 retransmits a message when the retransmission determination unit 14 determines to perform the retransmission.

The history management unit 13 is a portion that stores, in the history storage unit 12, a history relating to success or failure of delivery to each of destinations of a message. According to the present example embodiment, it is assumed that the history management unit 13 stores the number of delivery attempts until delivery succeeds in the history storage unit 12. When, for example, the message delivery unit 11 attempts three deliveries in total for one message and succeeds in delivery on a third attempt, the history management unit 13 stores "3" in the history storage unit 12. When the message delivery unit 11 attempts delivery and as a result, does not succeed in the delivery, the history management unit 13 stores "0" in the history storage unit 12 regardless of the number of attempts of delivery so far. The history storage unit 12 stores the above-described number of attempts with respect to each destination of a message (each telephone number in a case of an SMS).

Figure 4:
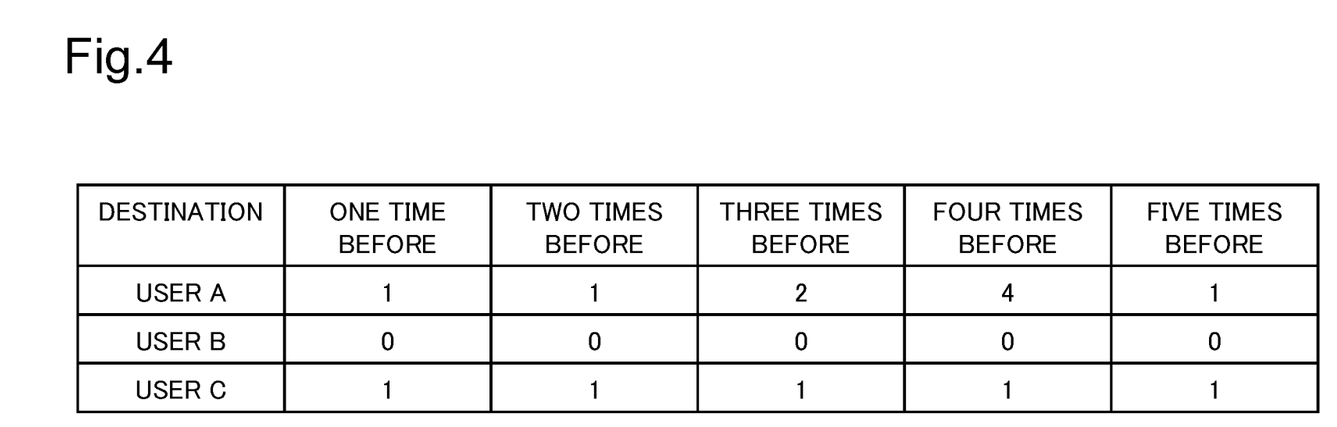
FIG. 4 shows a diagram illustrating an example of a history stored in a history storage unit of a message delivery device according to the second example embodiment of the present invention.

FIG. 4 illustrates an example of a history stored by the history storage unit 12. In this example, the history storage unit 12 stores a history of the number of attempts for past five attempts for each destination, but the history storage unit 12 can store a history for any number.

The retransmission determination unit 14 is a portion that determines, based on a history stored in the history storage unit 12, whether to retransmit a message when delivery of the message fails. According to the present example embodiment, the retransmission determination unit 14 calculates, based on a history, a retransmission point. A retransmission point is an index representing priority of retransmission with respect to each message. According to the present example embodiment, it is assumed that a retransmission point is larger as a success rate of delivery to a destination of a target is higher.

A retransmission point is smaller as a success rate of delivery is lower and a degree of intending to perform retransmission is smaller. Therefore, according to the present example embodiment, the retransmission determination unit 14 determines not to retransmit but to discard a message having a retransmission point of a value equal to or less than a first threshold value and determines to retransmit a message having a retransmission point of a value larger than the first threshold value. By doing as described above, the message delivery unit 11 does not retransmit a message to a destination having a low delivery success rate, and therefore a cost for retransmitting a message to a destination having a low success rate can be reduced.

Next, a calculation method of a retransmission point is described.

The retransmission determination unit 14 calculates a retransmission point, based on a history. The retransmission determination unit 14 may calculate a transmission point by considering, in addition to a history, immediacy of a message and a cost required for delivery. When immediacy of a message is considered, it is highly possible for a message having high immediacy to become a meaningless message at a time of retransmission, and therefore the retransmission determination unit 14 decreases a retransmission point as immediacy is higher. When a cost is considered, a total cost can be reduced when as few messages having a high cost as possible are delivered, and therefore the retransmission determination unit 14 decreases a retransmission point as a cost is larger.

According to the present example embodiment, the retransmission determination unit 14 calculates a retransmission point, for example, by using expression 1, based on a history, immediacy of a message, and a cost required for delivery.

$$\text{Retransmission point} = \text{delivery success rate} \times \text{immediacy} \times (1/\text{cost}) \quad \text{(Expression 1)}$$

The retransmission determination unit 14 calculates a delivery success rate, based on a history of the history storage unit 12. A delivery success rate can be calculated by calculating a reciprocal of the number of average attempts (1/number of average attempts), and the number of average attempts can be calculated by dividing the number of attempts until delivery succeeds by the number of successes in delivery. As in FIG. 4, when, for example, a history for past five attempts is stored in the history storage unit 12, the number of average attempts of a user A can be calculated by 9/5. Therefore, a delivery access rate of the user A is 5/9. As in a user B, when delivery never succeeds, the retransmission determination unit 14 determines, as 0, a value of a delivery success rate of expression 1.

The retransmission determination unit 14 calculates a value of immediacy, based on information relating to a message to be delivered acquired when accepting the message to be delivered. As in FIG. 5, it is assumed that the message delivery unit 11 receives, for each message, for example, information of a destination, a delivery destination carrier, and immediacy from a request source (a message delivery application or the like) of message delivery. As in FIG. 5, when there are two types including "none" and "immediate" with respect to immediacy, the retransmission determination unit 14 determines a value of immediacy of expression 1 as 1 when immediacy of a message is "none" and determines a value of immediacy of expression 1 as 0 when immediacy of a message is "immediate". Immediacy "none" indicates that information of a delivery message is meaningful even when not immediately delivered. Immediacy "immediate" indicates that a content of a delivery message is meaningless when not immediately delivered as in, for example, an earthquake flash report.

The retransmission determination unit 14 determines a value of a cost required for delivery, based on a predetermined condition. The message delivery device 10 previously stores, for example, a correspondence table of a delivery cost with respect to each communication carrier as in FIG. 6, and the retransmission determination unit 14 acquires, from the correspondence table, a value of a cost corresponding to a delivery destination carrier of a message. According to FIG. 5, for example, a delivery destination carrier of a message a is a communication carrier X, and therefore the retransmission determination unit 14 acquires a delivery cost 10 corresponding to the communication carrier X from FIG. 6.

Figure 5:
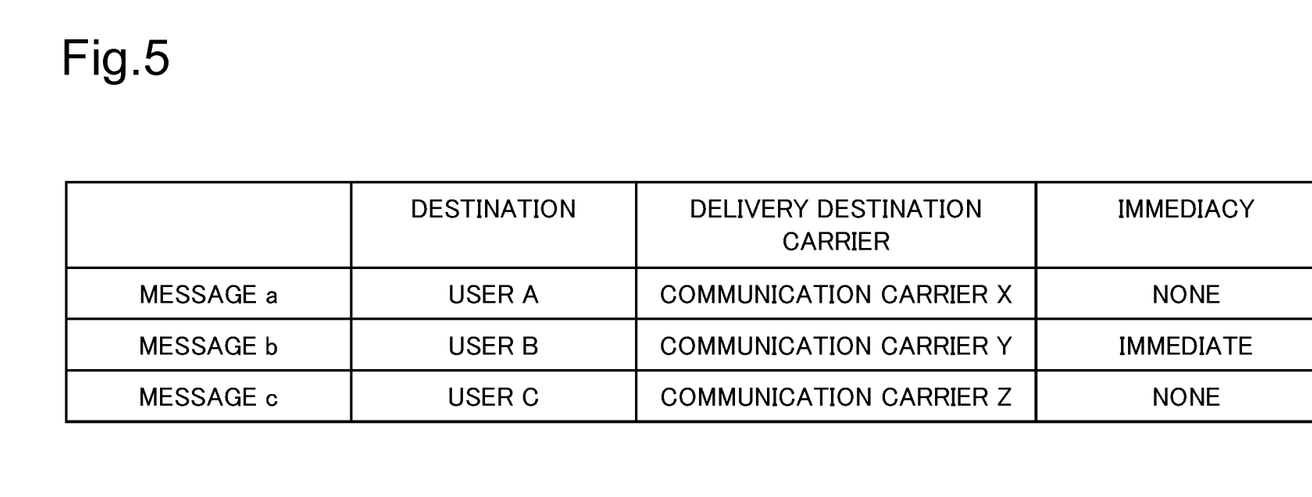
FIG. 5 shows a diagram illustrating an example of information relating to a message according to the second example embodiment of the present invention.
Figure 6:
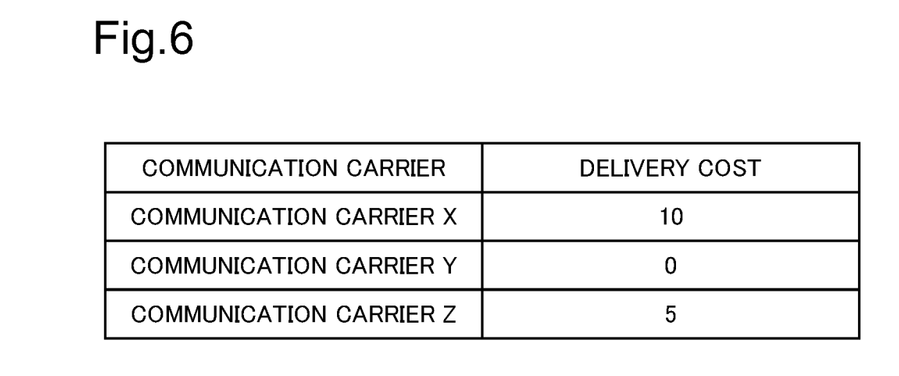
FIG. 6 shows a diagram illustrating an example of a delivery cost with respect to each communication carrier according to the second example embodiment of the present invention.

When the retransmission determination unit 14 calculates a retransmission point of a message a in FIG. 5 by using the above-described method, a retransmission point=$(1/1.8) \times 1 \times (1/10) = 1/18$ is acquired. The retransmission determination unit 14 compares a retransmission point with a first threshold value (delivery-invalid upper limit) and determines to perform retransmission when the retransmission point is larger than a first threshold value. The retransmission determination unit 14 determines not to perform retransmission when the retransmission point is equal to or less than the first threshold value.

The retransmission determination unit 14 may further determine, when a retransmission point is larger than a first threshold value, a timing of retransmitting a message according to the retransmission point. A transmission point is larger as a degree of intending to perform retransmission is higher. Therefore, the retransmission determination unit 14 compares, for example, a second threshold value (immediate delivery determination value) larger than a first threshold value with a retransmission point and determines, when the retransmission point is equal to or less than the second threshold value, that "a message is retransmitted after a predetermined waiting time elapses". The retransmission determination unit 14 determines, when the retransmission point is larger than the second threshold value, that "a message is retransmitted without waiting". The message delivery unit 11 retransmits a message at a timing determined by the retransmission determination unit 14.

The above-described first threshold value and second threshold value may be a fixed value or may be variable when the message delivery device 10 is operated. For example, according to a satisfaction degree or a cost expected by a company operating the message delivery device 10, it may be possible for a first threshold value and a second threshold value to be able to be modified during operation.

The above-described "waiting time" may be a predetermined fixed value or may be determined by the retransmission determination unit 14 according to a past delivery history. When, for example, there is a destination where the number of attempts during night-time is large and the number of attempts during daytime is small, the number of attempts can be decreased and a cost required for attempts can be reduced when a retransmission timing for the destination is set to exist during daytime.

Alternatively, it is possible that a period from a time of issuing a delivery request to a carrier in a past to a time of discarding a message is regarded as a period during which it is difficult for a destination user to receive a message and the retransmission determination unit 14 determines, based on the period, a retransmission waiting time. For example, a time during which reception is impossible can be a retransmission waiting time. By doing as described above, it is possible that the number of attempts is decreased and a cost required for retransmission is reduced.

By configuring the message delivery device 10 as described above, the message delivery device 10 determines, based on a history relating to success and failure of delivery to each of destinations of a message, whether to retransmit the message and performs the retransmission of the message when determining to perform the retransmission. Thereby, the message delivery device 10 reduces messages to be retransmitted. Therefore, an increase in a cost required for message retransmission can be reduced.

According to the present example embodiment, the message delivery device 10 further determines, when determining to perform retransmission, a retransmission timing of a message according to a retransmission point (priority of retransmission). Thereby, a retransmission frequency of a message having low priority is lowered, and therefore an increase in a cost required for message retransmission can be further reduced.

Figure 7:
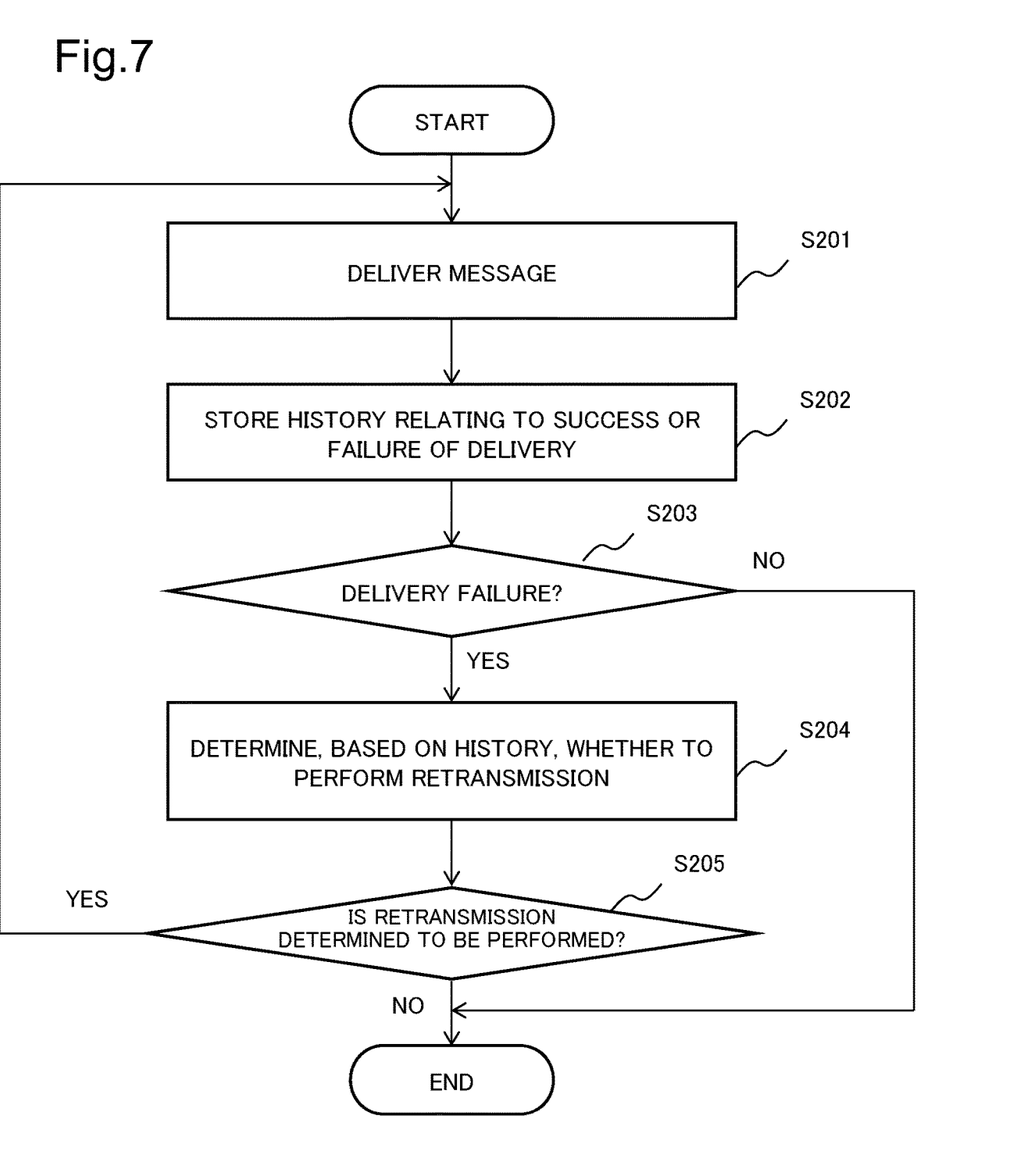
FIG. 7 shows a diagram illustrating an operation example of the message delivery device according to the second example embodiment of the present invention.

Next, by using FIG. 7, an operation example of the message delivery device 10 according to the present example embodiment is described.

First, the message delivery unit 11 of the message delivery device 10 issues a delivery request of a message to the communication carrier device 50, and the communication carrier device 50 delivers the message to the terminal 70 (step S201). The communication carrier device 50 reports a delivery result (success or failure) of the message to the message delivery device 10.

The message delivery unit 11 of the message delivery device 10 receives the delivery result, and the history management unit 13 stores a history relating to success or failure of the delivery in the history storage unit 12 (step S202).

Next, the retransmission determination unit 14 determines, when the delivery of the message fails (YES in step S203), whether to retransmit the message, based on the history in the history storage unit 12 (step S204).

The message delivery unit 11 delivers the message again (step S201) when the retransmission determination unit 14 determines to perform the retransmission (YES in step S205). The message delivery unit 11 does not retransmit but discards a message determined, by the retransmission determination unit 14, not to be retransmitted.

Figure 8:
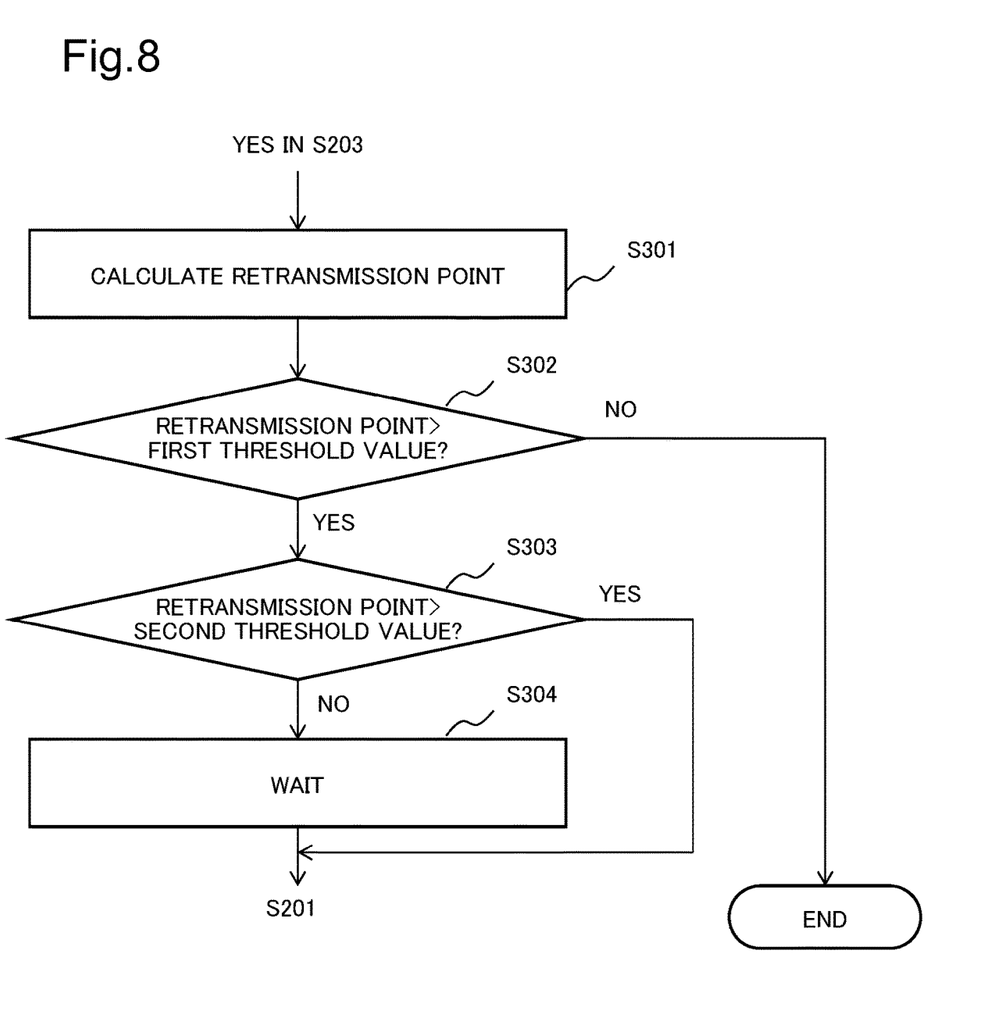
FIG. 8 shows a diagram illustrating an operation example of the message delivery device according to the second example embodiment of the present invention.

Next, FIG. 8 illustrates an operation example of retransmission determination. The operation example in FIG. 8 is an example of an operation executed by the message delivery device 10, instead of operations of step S204 and step S205 in FIG. 7.

The retransmission determination unit 14 calculates, when delivery of a message fails (YES in step S203), a retransmission point by using the above-described method (step S301). Next, when the retransmission point is larger than a first threshold value (YES in step S302), the retransmission determination unit 14 determines to perform retransmission. When the retransmission point is larger than the first threshold value and is equal to or less than a second threshold value (NO in step S303), the message delivery unit 11 waits for a predetermined waiting time (step S304) and retransmits a message (step S201). When the retransmission point is larger than the second threshold value (YES in step S303), the message delivery unit 11 does not wait but retransmits a message (step S201). When the retransmission point is equal to or less than the first threshold value (NO in step S302), the retransmission determination unit 14 determines not to perform retransmission and the message delivery unit 11 discards the message.

Figure 9:
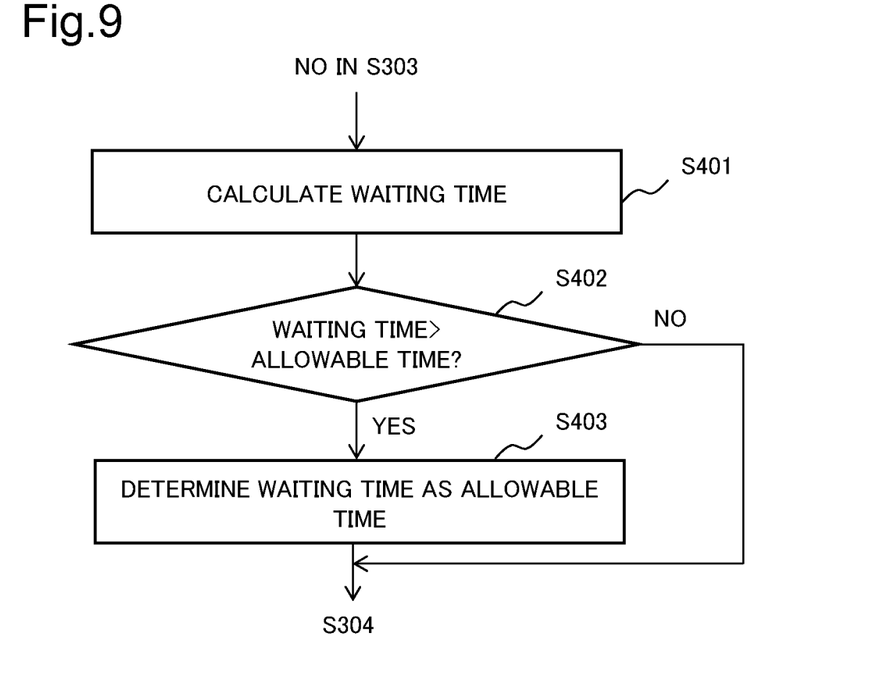
FIG. 9 shows a diagram illustrating an operation example of the message delivery device according to the second example embodiment of the present invention.

In the above description, for immediacy, there are two types of none/immediate, but immediacy can be defined as an allowable time of a retransmission waiting time, instead of two types of none/immediate for immediacy. FIG. 9 illustrates an operation example of the message delivery device 10 at that time. FIG. 9 is an example of an operation executed by the message delivery device 10 between step S303 and step S304 in FIG. 8.

The retransmission determination unit 14 calculates a retransmission point, for example, by using expression 2 (step S301 in FIG. 8) and further calculates a waiting time from the retransmission point by using a predetermined conversion condition (step S401). At that time, in such a way as to be early able to retransmit a message having high priority, a conversion condition may be a condition in which as a retransmission point is larger, a waiting time is shorter.

$$\text{Retransmission point} = \text{delivery success rate} \times (1/\text{cost}) \quad \text{(Expression 2)}$$

Figure 10:
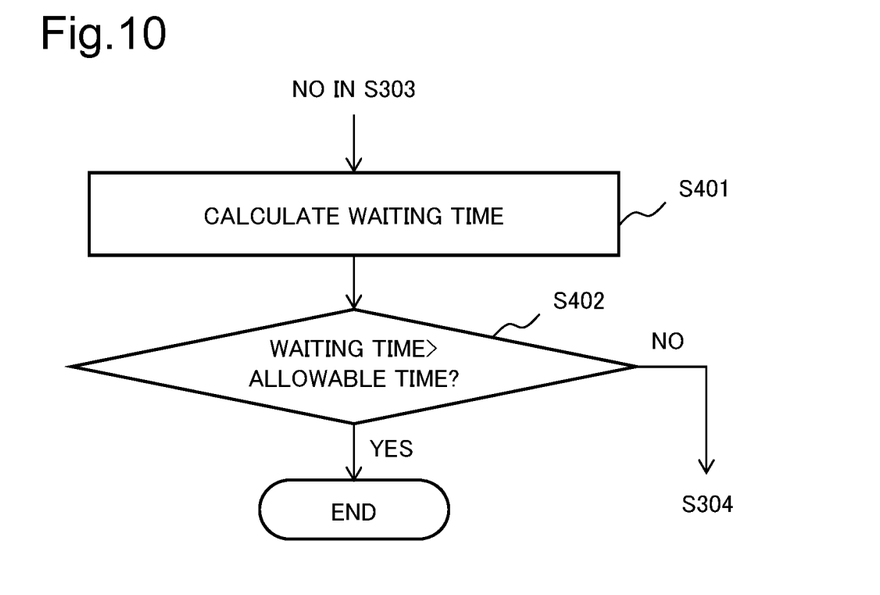
FIG. 10 shows a diagram illustrating an operation example of the message delivery device according to the second example embodiment of the present invention.

The retransmission determination unit 14 determines, when the calculated waiting time is larger than an allowable time (YES in step S402), a waiting time in step S304 as an allowable time (step S403). Alternatively, as in FIG. 10, when the calculated waiting time is larger than an allowable time (YES in step S402), the message delivery unit 11 may not retransmit but discard a message. The message delivery unit 11 retransmits, when a waiting time is equal to or less than the allowable time (NO in step S402), a message after the calculated waiting time elapses (step S304, step S201).

By doing as described above, the message delivery device 10 determines, based on a history relating to success or failure of delivery to each of destinations of a message, whether to retransmit the message and performs the retransmission of the message when determining to perform the retransmission. Thereby, the message delivery device 10 reduces messages to be retransmitted. Therefore, an increase in a cost required for message retransmission can be reduced.

As described above, according to the second example embodiment of the present invention, the message delivery device 10 determines, based on a history relating to success or failure of delivery to each of destinations of a message, whether to retransmit the message and performs the retransmission of the message when determining to perform the retransmission. Thereby, the message delivery device 10 reduces messages to be retransmitted. Therefore, an increase in a cost required for message retransmission can be reduced.

According to the present example embodiment, the message delivery device 10 further determines, when determining to perform retransmission, a retransmission timing of a message according to a retransmission point (priority of retransmission). Thereby, a retransmission frequency of a message having low priority can be lowered, and therefore an increase in a cost required for message retransmission can be further reduced.

[Hardware Configuration Example]

A configuration example of a hardware resource that executes, by using one information processing device (computer), a message delivery device (10) according to the above-described example embodiments of the present invention is described. A message delivery device may be achieved by using at least two information processing devices physically or functionally. A message delivery device may be achieved as a dedicated device. Only a function of a part of a message delivery device may be achieved by using an information processing device.

Figure 11:
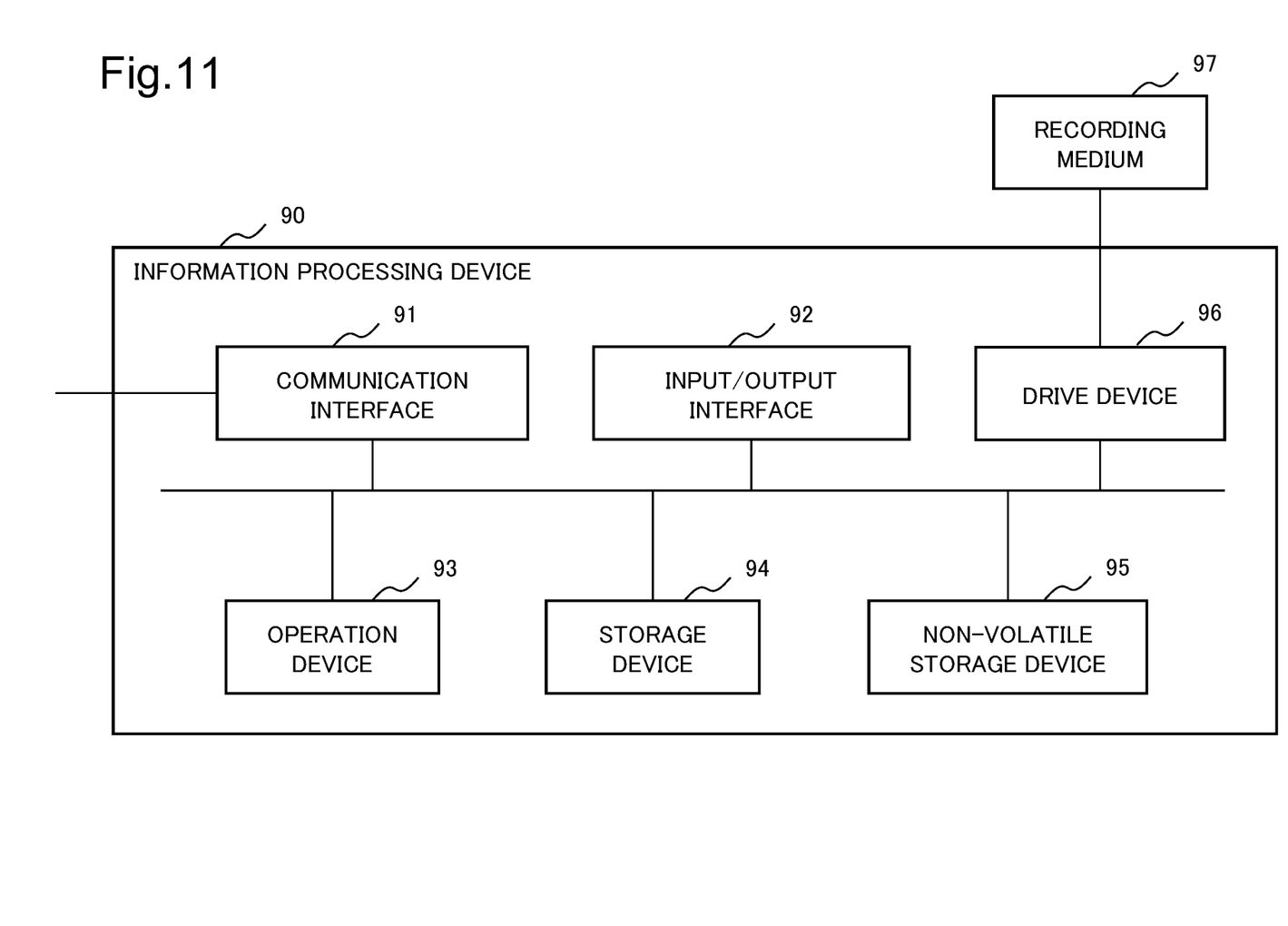
FIG. 11 shows a diagram illustrating a hardware configuration example according to example embodiments of the present invention.

FIG. 11 shows a diagram conceptually illustrating a hardware configuration example of an information processing device capable of achieving a message delivery device according to the example embodiments of the present invention. An information processing device 90 includes a communication interface 91, an input/output interface 92, an operation device 93, a storage device 94, a non-volatile storage device 95, and a drive device 96.

The communication interface 91 is a communication means with which a message delivery device according to each example embodiment communicates with an external device wiredly or/and wirelessly. When a message delivery device is achieved by using at least two information processing devices, these devices may be connected in such a way as to mutually communicate via the communication interface 91.

The input/output interface 92 is a man-machine interface such as a key board being one example of an input device, a display as an output device, and the like.

The operation device 93 is an arithmetic processing device such as a general-purpose central processing unit (CPU), a microprocessor, and the like. The operation device 93 reads, for example, various types of programs stored in the non-volatile storage device 95 into the storage device 94 and can execute processing in accordance with the read program.

The storage device 94 is a memory device such as a random access memory (RAM) and the like able to be referred to from the operation device 93 and stores a program and various types of data. The storage device 94 may be a volatile memory device.

The non-volatile storage device 95 is, for example, a non-volatile storage device such as a read only memory (ROM), a flash memory, and the like and can store various types of programs, data and the like.

The drive device 96 is, for example, a device that processes read and write of data for a recording medium 97 to be described later.

The recording medium 97 is, for example, any recording medium such as an optical disc, a magnetooptical disc, a semiconductor flash memory, and the like capable of recording data.

Example embodiments of the present invention may be achieved, for example, by configuring a message delivery device by using the information processing device 90 exemplarily illustrated in FIG. 11 and supplying a program capable of achieving a function described according to the example embodiments to the message delivery device.

In this case, the program supplied to the message delivery device is implemented by the operation device 93 and thereby an example embodiment can be achieved. A part of a function of the message delivery device instead of a whole of the device can be configured by using the information processing device 90.

It may be possible that the program is recorded on the recording medium 97 and the program is appropriately stored in the non-volatile storage device 95 in a shipment stage or an operation stage of a message delivery device. In this case, as a supply method of the program, a method of installation into the message delivery device by using an appropriate tool in a production stage before shipment, an operation stage or the like is employable. As a supply method of the program, a general procedure such as a method of download from an outside via a communication line such as the Internet and the like is employable.

A part or the whole of the example embodiments can be described as, but not limited to, the following claims.

(Supplementary Note 1)

A message delivery device comprising:

a message delivery means that delivers a message;

a history management means that stores, in a history storage means, a history relating to success or failure of the delivery to each of destinations of the message; and a retransmission determination means that issues, when a result of determining, based on the history, whether to perform retransmission of the message is positive when the delivery of the message fails, an instruction for the retransmission of the message to the message delivery means.

(Supplementary Note 2)

The message delivery device according to supplementary note 1, wherein the retransmission determination means calculates, based on the history, a retransmission point that is larger as a success rate of the delivery to the destination of the message is higher and determines to perform the retransmission when the retransmission point is larger than a first threshold value.

(Supplementary Note 3)

The message delivery device according to supplementary note 2, wherein the retransmission point is smaller as a cost required for the delivery is larger.

(Supplementary Note 4)

The message delivery device according to supplementary note 2 or 3, wherein the retransmission point is small when immediacy of the message is high and is large when the immediacy is low.

(Supplementary Note 5)

The message delivery device according to any one of supplementary notes 2 to 4, wherein the message delivery means performs, when the retransmission point is larger than the first threshold value and is equal to or less than a second threshold value, the retransmission after a predetermined waiting time elapses and does not wait but performs the retransmission when the retransmission point is larger than the second threshold value.

(Supplementary Note 6)

The message delivery device according to supplementary note 5, wherein the retransmission determination means calculates the waiting time, based on the retransmission point and, when the calculated waiting time exceeds an allowable time of the message, determines the waiting time until the retransmission of the message as the allowable time or determines not to perform the retransmission of the message.

(Supplementary Note 7)

A message delivery method comprising:

delivering a message;

storing, in a history storage unit, a history relating to success or failure of the delivery to each of destinations of the message;

determining, based on the history, whether to perform retransmission of the message when the delivery of the message fails; and performing the retransmission of the message when determining to perform the retransmission.

(Supplementary Note 8)

The message delivery method according to supplementary note 7, further comprising:

calculating, based on the history, a retransmission point that is larger as a success rate of the delivery to the destination of the message is higher; and determining to perform the retransmission when the retransmission point is larger than a first threshold value.

(Supplementary Note 9)

The message delivery method according to supplementary note 8, wherein the retransmission point is smaller as a cost required for the delivery is larger.

(Supplementary Note 10)

The message delivery method according to supplementary note 8 or 9, wherein the retransmission point is small when immediacy of the message is high and is large when the immediacy is low.

(Supplementary Note 11)

The message delivery method according to any one of supplementary notes 8 to 10, further comprising:

performing, when the retransmission point is larger than the first threshold value and is equal to or less than a second threshold value, the retransmission after a predetermined waiting time elapses; and not waiting but performing the retransmission when the retransmission point is larger than the second threshold value.

(Supplementary Note 12)

The message delivery method according to supplementary note 11, further comprising:

calculating the waiting time, based on the retransmission point; and, when the calculated waiting time exceeds an allowable time of the message, determining the waiting time until the retransmission of the message as the allowable time or determining not to perform the retransmission of the message.

(Supplementary Note 13)

A computer-readable recording medium recording a message delivery program causing a computer to achieve:

a message delivery function of delivering a message:

a history management function of storing, in a history storage unit, a history relating to success or failure of the delivery to each of destinations of the message; and a retransmission determination function of issuing, when a result of determining, based on the history, whether to perform retransmission of the message is positive when the delivery of the message fails, an instruction for the retransmission of the message to the message delivery function.

(Supplementary Note 14)

The computer-readable recording medium recording the message delivery program according to supplementary note 13, wherein the retransmission determination function calculates, based on the history, a retransmission point that is larger as a success rate of the delivery to the destination of the message is higher and determines to perform the retransmission when the retransmission point is larger than a first threshold value.

(Supplementary Note 15)

The computer-readable recording medium recording the message delivery program according to supplementary note 14, wherein the retransmission point is smaller as a cost required for the delivery is larger.

(Supplementary Note 16)

The computer-readable recording medium recording the message delivery program according to supplementary note 14 or 15, wherein the retransmission point is small when immediacy of the message is high and is large when the immediacy is low.

(Supplementary Note 17)

The computer-readable recording medium recording the message delivery program according to any one of supplementary notes 14 to 16, wherein the message delivery function performs, when the retransmission point is larger than the first threshold value and is equal to or less than a second threshold value, the retransmission after a predetermined waiting time elapses and does not wait but performs the retransmission when the retransmission point is larger than the second threshold value.

(Supplementary Note 18)

The computer-readable recording medium recording the message delivery program according to supplementary note 17, wherein the retransmission determination function calculates the waiting time, based on the retransmission point and, when the calculated waiting time exceeds an allowable time of the message, determines the waiting time until the retransmission of the message as the allowable time or determines not to perform the retransmission of the message.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Message delivery device
11 Message delivery unit
12 History storage unit
13 History management unit
14 Retransmission determination unit
40 Network
50 Communication carrier device
60 Communication carrier network
70 Terminal
90 Information processing device
91 Communication interface
92 Input/output interface
93 Operation device
94 Storage device
95 Non-volatile storage device
96 Drive device
97 Recording medium

The invention claimed is:

1. A message delivery device comprising one or more memories storing instructions and one or more processors configured to execute the instructions to:

deliver an SMS message;

store, in a history storage, a history relating to success or failure of the delivery to each of destinations of the SMS message;

perform retransmission of the SMS message, when a result of determining, based on the history, whether to perform the retransmission of the SMS message is positive when the delivery of the SMS message fails:

calculate, based on the history, a retransmission point that equals a delivery success rate times an immediacy divided by a cost required for delivery and determine to perform the retransmission when the retransmission point is larger than a first threshold value;

perform, when the retransmission point is larger than the first threshold value and is equal to or less than a second threshold value, the retransmission after a predetermined waiting time elapses and not to wait but to perform the retransmission when the retransmission point is larger than the second threshold value; and calculate the waiting time, based on the retransmission point and, when the calculated waiting time exceeds an allowable time of the SMS message, determine the waiting time until the retransmission of the SMS message as the allowable time.

2. The message delivery device according to claim 1, wherein the retransmission point is smaller as a cost required for the delivery is larger.

3. The message delivery device according to claim 1, wherein the retransmission point is small when immediacy of the SMS message is high and is large when the immediacy is low.

4. A message delivery method comprising:

delivering an SMS message;

storing, in a history storage unit, a history relating to success or failure of the delivery to each of destinations of the SMS message;

determining, based on the history, whether to perform retransmission of the message when the delivery of the message fails;

performing the retransmission of the SMS message when determining to perform the retransmission;

calculating, based on the history, a retransmission point that equals a delivery success rate times an immediacy divided by a cost required for delivery;

determining to perform the retransmission when the retransmission point is larger than a first threshold value;

performing, when the retransmission point is larger than the first threshold value and is equal to or less than a second threshold value, the retransmission after a predetermined waiting time elapses; not waiting but performing the retransmission when the retransmission point is larger than the second threshold value;

calculating the waiting time, based on the retransmission point, and when the calculated waiting time exceeds an allowable time of the SMS message, determining the waiting time until the retransmission of the SMS message as the allowable time.

5. The message delivery method according to claim 4, wherein the retransmission point is smaller as a cost required for the delivery is larger.

6. The message delivery method according to claim 4, wherein the retransmission point is small when immediacy of the SMS message is high and is large when the immediacy is low.

7. A non-transitory computer-readable recording medium recording a message delivery program causing a computer to execute:

a message delivery function of delivering an SMS message;

a history management function of storing, in a history storage unit, a history relating to success or failure of the delivery to each of destinations of the SMS message; and a retransmission determination function of issuing, when a result of determining, based on the history, whether to perform retransmission of the SMS message is positive when the delivery of the SMS message fails, an instruction for the retransmission of the SMS message to the message delivery function, wherein the retransmission determination function calculates, based on the history, a retransmission point that equals a delivery success rate times an immediacy divided by a cost required for delivery and determines to perform the retransmission when the retransmission point is larger than a first threshold value, the message delivery function performs, when the retransmission point is larger than the first threshold value and is equal to or less than a second threshold value, the retransmission after a predetermined waiting time elapses and does not wait but performs the retransmission when the retransmission point is larger than the second threshold value, and the retransmission determination function calculates the waiting time, based on the retransmission point and, when the calculated waiting time exceeds an allowable time of the SMS message, determines the waiting time until the retransmission of the SMS message as the allowable time.

8. The non-transitory computer-readable recording medium recording the message delivery program according to claim 7, wherein the retransmission point is smaller as a cost required for the delivery is larger.

9. The non-transitory computer-readable recording medium recording the message delivery program according to claim 7, wherein the retransmission point is small when immediacy of the SMS message is high and is large when the immediacy is low.

* * * * *